US006888814B2

United States Patent
Zeira et al.

(10) Patent No.: US 6,888,814 B2
(45) Date of Patent: May 3, 2005

(54) CODE ALLOCATION BASED ON CROSS CODE CORRELATION

(75) Inventors: Ariela Zeira, Huntington, NY (US); Eldad Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/212,986

(22) Filed: Aug. 5, 2002

(65) Prior Publication Data

US 2003/0156562 A1 Aug. 21, 2003

Related U.S. Application Data (60) Provisional application No. 60/358,208, filed on Feb. 20, 2002.

(51) Int. Cl.[7] .............................................. H04B 7/216
(52) U.S. Cl. ...................................... 370/342; 370/335
(58) Field of Search ................................. 370/310, 328, 370/329, 334, 335, 342, 441, 479; 455/62, 63.1, 67.1, 452.1

(56) References Cited

U.S. PATENT DOCUMENTS

| | | | |
|---|---|---|---|
| 6,023,462 A | * | 2/2000 | Nieczyporowicz et al. . 370/335 |
| 6,069,884 A | * | 5/2000 | Hayashi et al. ............. 370/335 |
| 6,542,484 B1 | * | 4/2003 | Ovesjo et al. .............. 370/335 |
| 6,577,671 B1 | * | 6/2003 | Vimpari ...................... 375/146 |
| 2002/0003785 A1 | * | 1/2002 | Agin ........................... 370/333 |

OTHER PUBLICATIONS

Simic et al. "On the Capacity of a Cellular CDMA Ssytem Employing Power Control on Fading Channels", IEEE Telsiks. Oct. 13–15, 1999. pp. 562–565.*
Galewski, Piotr. "Channel Assignment in CDMA with Walsh and PN Coding". IEEE. May 6–9, 2001. pp. 982–986.*
Xu, Zhengyuan. "Asymptotically Near–Optimal Blind Estiimation of Multipath CDMA Channels". IEEE. Sep. 2001. pp. 2003–2017.*

* cited by examiner

*Primary Examiner*—Chi Pham
*Assistant Examiner*—Derrick W Ferris
(74) *Attorney, Agent, or Firm*—Volpe and Koenig, P.C.

(57) ABSTRACT

The invention includes various approaches to assigning codes in wireless code division multiple access communication systems. The invention estimates the cross code correlation between codes to base the code assignment. One approach assigns codes having a high cross correlation to users having a low transmission power level. Another approach assigns code groups having a high cross correlation to a same coded composite transport channel. Another approach assigns codes using a cross correlation factor of each code to minimize a system noise rise. Another approach uses transmission or reception diversity to assign bad code groups to users having a different diversity relationship. Another approach uses a diversity factor and a cross code correlation factor to assign codes.

59 Claims, 6 Drawing Sheets

CODE ALLOCATION BASED ON CROSS CODE CORRELATION

This application claims priority to provisional application No. 60/358,208, filed Feb. 20, 2002.

BACKGROUND

This application generally relates to wireless code division multiple access communication systems. In particular, this application relates to code allocation in such systems using cross code correlation characteristics.

Figure 1:
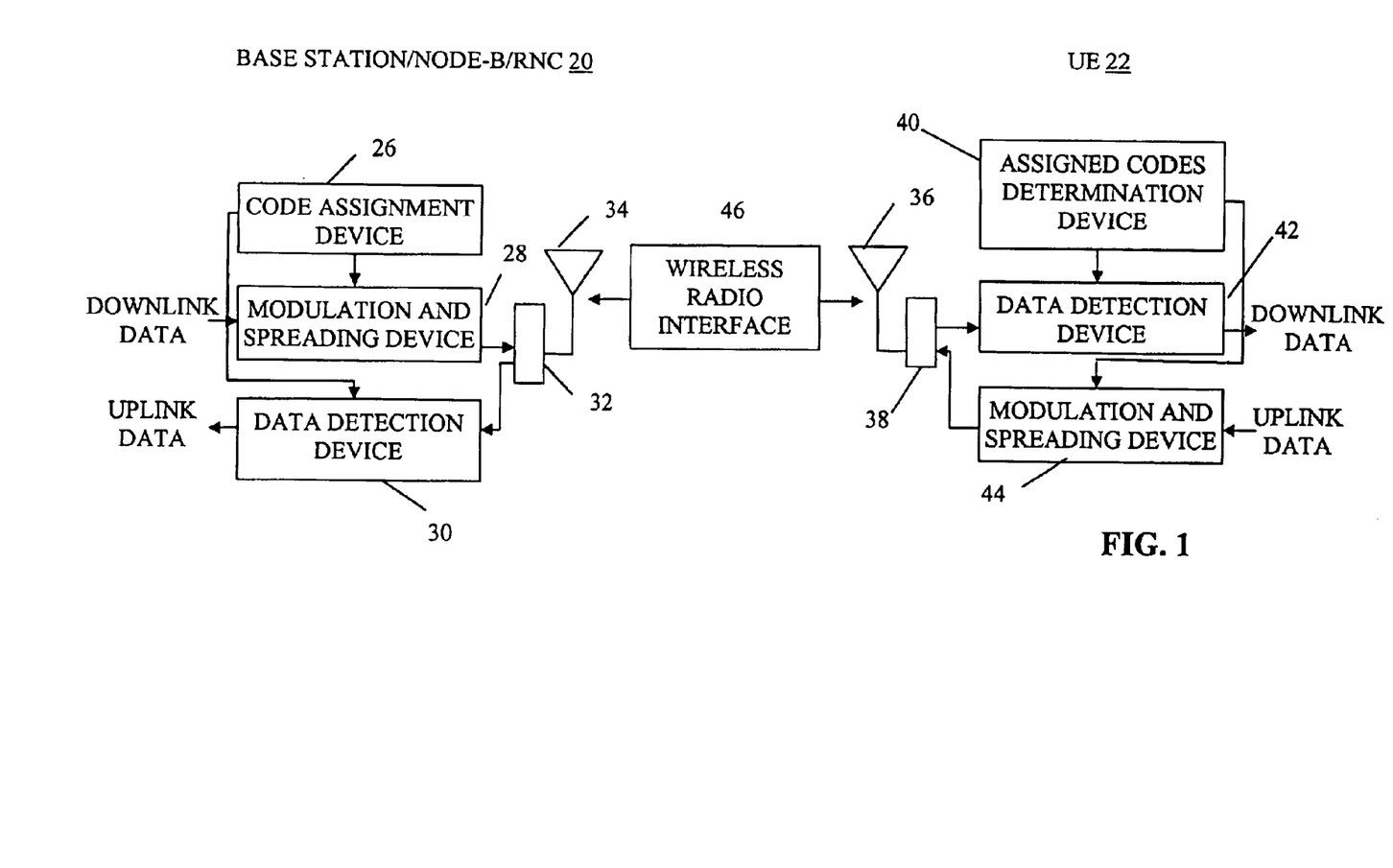
FIG. 1 is an illustration of a simplified base station and UE.

To send multiple communications simultaneously over a shared spectrum, CDMA communication systems distinguish the communications using codes. FIG. 1 illustrates a simplified wireless code division multiple access (CDMA) communication system. The following discussion refers to components that may be located in either the base station, a Node-B or a radio network controller (RNC) 20, based on the implementation, as being located at the base station 20.

For downlink communications, codes are assigned by a code assignment device 26 of the base station 20 to support the downlink communications. Downlink data is processed by a modulation and spreading device 28 with the assigned codes to produce one or multiple downlink communications. The downlink communications are passed through an isolator or switch 32 and radiated by an antenna or antenna array 34 of the base station 20 through a wireless radio interface 46.

The user equipment 22 receives the downlink communications using an antenna or antenna array 36. The received communications pass through an isolator or switch 38 to a data detection device 42. The data detection device 42 recovers data from the received communications using the assigned downlink codes. These assigned codes may be determined by a form of blind code detection, be known a priori, the code assignment may be signaled or by other means. A code assignment determination device 40 determines the assigned codes.

For uplink communications, uplink data is processed by a modulation and spreading device 44 with uplink assigned codes to produce one or multiple uplink communications. The code assignment determination device 40 determines the codes to use for the uplink. The uplink communications are passed through the isolator or switch 38 and radiated by an antenna or antenna array 36 of the UE 22 through the wireless radio interface 46.

The base station 20 receives the uplink communications using its antenna or antenna array 34. The received communications pass through an isolator or switch 32 to a data detection device 30. The data detection device 30 recovers data from the received communications using the assigned uplink codes as determined by the code assignment device 26.

When a user in such a system requires additional codes to support a new or existing service, the code assignment decision is based on the available codes and power budgets. To illustrate, the user requires one additional uplink code to support a new service. A code out of the available codes is selected to support the service. The required transmission power level for a communication using this new code is determined, such as by using a path loss estimate, known interference levels and other factors. If the use of this code requires transmission power levels beyond the systems resources. The new service is not permitted.

As the number of codes increases, the effectiveness of this assignment approach degrades. The likelihood of using or finding codes with good cross correlation properties decreases, as the number of used codes increases. Although codes are designed to have minimal or low cross interference, in practice, some codes may exhibit high cross correlation with other codes. These codes will typically be eliminated from use in the system. Additionally, a group of codes, a code group, may exhibit a high cross correlation with each other, but acceptable cross correlation with other codes. Although eliminating these codes reduces cross interference, it also reduces the number of available codes to assign.

Accordingly, it is desirable to have other code assignment approaches to allow more efficient code assignments.

SUMMARY

The invention includes various approaches to assigning codes in wireless code division multiple access communication systems. The invention estimates the cross code correlation between codes to base the code assignment. One approach assigns codes having a high cross correlation to users having a low transmission power level. Another approach assigns code groups having a high cross correlation to a same coded composite transport channel. Another approach assigns codes using a cross correlation factor of each code to minimize a system noise rise. Another approach uses transmission or reception diversity to assign bad code groups to users having a different diversity relationship. Another approach uses a diversity factor and a cross code correlation factor to assign codes.

DETAILED DESCRIPTION OF THE PREFERRED EMBODIMENT(S)

The embodiments of the invention can generally be used with any type of CDMA system, such as a time division duplex communication system using CDMA (TDD/

CDMA), frequency division duplex communication system using CDMA (FDD/CDMA) or a hybrid time division multiple access/CDMA communication system (TDMA/CDMA).

Figure 2:
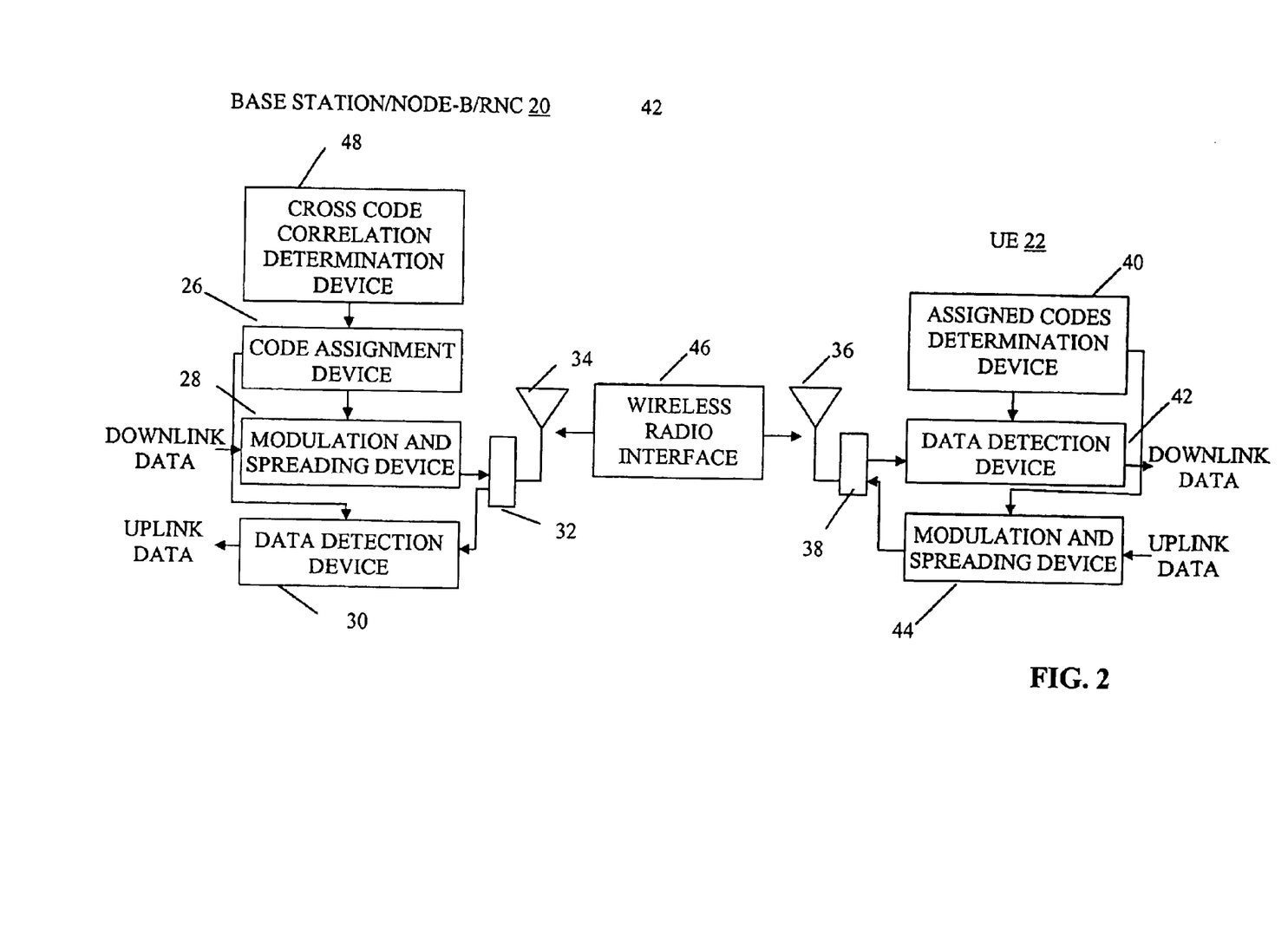
FIG. 2 is an illustration of a simplified base station and UE using cross code correlation for code assignments.

FIG. 2 illustrates an embodiment of a code allocation system using cross code correlation. A cross code correlation determination device 48 evaluates the cross correlation between codes. The cross code correlation may be determined off-line and stored. Alternately, the cross code correlation may be determined on-line, as needed.

One approach to evaluating codes for cross correlation ranks the codes from a best code, exhibiting no or minimal cross code correlation, to a worst code, exhibiting the most cross code correlation. Another approach categorizes codes, such as by using a threshold test. One categorization approach uses two categories: good codes, exhibiting no or minimal cross code correlation, and bad codes, exhibiting high cross code correlation. Other categorizations may be used, such as good, medium and bad.

Additionally, code groups, such as groups of two codes, three codes or more, may be evaluated. The codes of the group are evaluated with respect to the cross code correlation to each other. The code groups may be ranked from groups having no or a low cross correlation to groups having a high cross correlation to each other. Alternately, the groups may be categorized, such as into good groups, having no or little cross correlation, and bad groups, having high cross correlation to each other.

Based on the code evaluation, the code assignment device 26 assigns codes to uplink and downlink communications. The UE 22 determines the code assignment using an assigned code determination device 40. For downlink communications, downlink data is processed by a modulation and spreading device 28 with the assigned codes to produce one or multiple downlink communications. The downlink communications are passed through an isolator or switch 32 and radiated by an antenna or antenna array 34 of the base station 20 through a wireless radio interface 46.

The UE 22 receives the downlink communications using an antenna or antenna array 36. The received communications pass through an isolator or switch 38 to a data detection device 42. The data detection device 42 recovers data from the received communications using the assigned downlink codes.

For uplink communications, uplink data is processed by a modulation and spreading device 44 with the uplink assigned codes to produce one or multiple uplink communications. The uplink communications are passed through an isolator or switch 38 and radiated by an antenna or antenna array 36 of the UE 22 through the wireless radio interface 46.

The base station 20 receives the uplink communications using its antenna or antenna array 34. The received communications pass through an isolator or switch 32 to a data detection device 30. The data detection device 30 recovers data from the received communications using the assigned uplink codes.

One approach to assign codes in the downlink assigns code groups having a high cross code correlation to each other to a user or users transmitting at a substantially same power level. Codes transmitted at different power levels are more difficult to distinguish than codes transmitted at the substantially same power level. As a result, by transmitting codes having a high cross correlation at the same power level, the impact of high cross code correlation is minimized.

Figure 3:
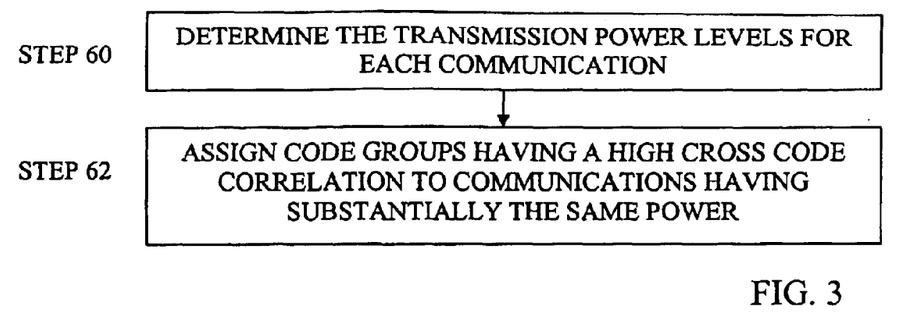
FIG. 3 is a flow chart for assigning codes having a high cross code correlation to communications having a substantially same transmission power level.

To assign the codes as shown in FIG. 3, the transmission power levels for each downlink communication is determined, step 60. The code groups having a high cross code correlation are assigned to the communications having substantially the same power level, step 62.

Figure 4:
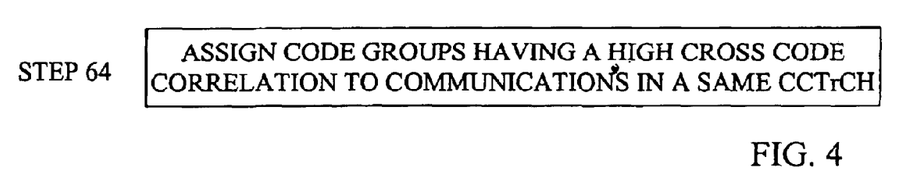
FIG. 4 is a flow chart for assigning code groups having a high cross code correlation to a same coded composite transport channel.

Since the transmission power levels for communications to different users and even to the same user in a different coded composite transport channel (CCTrCH) vary over time with respect to each other, it is preferred to only assign code groups having a high cross correlation to the same CCTrCH. Accordingly, as shown in FIG. 4, if a code group having a high cross correlation is to be used, that code group is assigned to the same CCTrCH, step 64. This code assignment approach can also be applied to the uplink, preferably when all communications use the same spreading factor.

Figure 5:
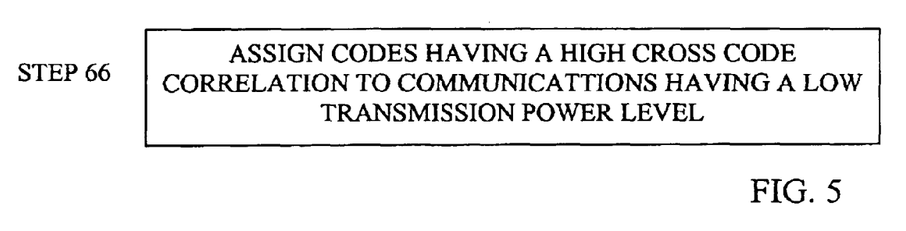
FIG. 5 is a flow chart for assigning codes having a high cross code correlation to communications having a low transmission power level.

Another approach as shown in FIG. 5 assigns codes having a high cross correlation to communications having a low transmission power level, step 66. This approach minimizes the cross interference that a bad code (code having a high cross correlation) induces on the other communications and vice versa. Conversely, codes having a low cross correlation are assigned to communications having a high transmission power level.

In another approach, the cross code correlation can be used to estimate a change in noise level resulting from changing codes or adding new codes. A code assignment can be determined to minimize the noise level.

Figure 6:
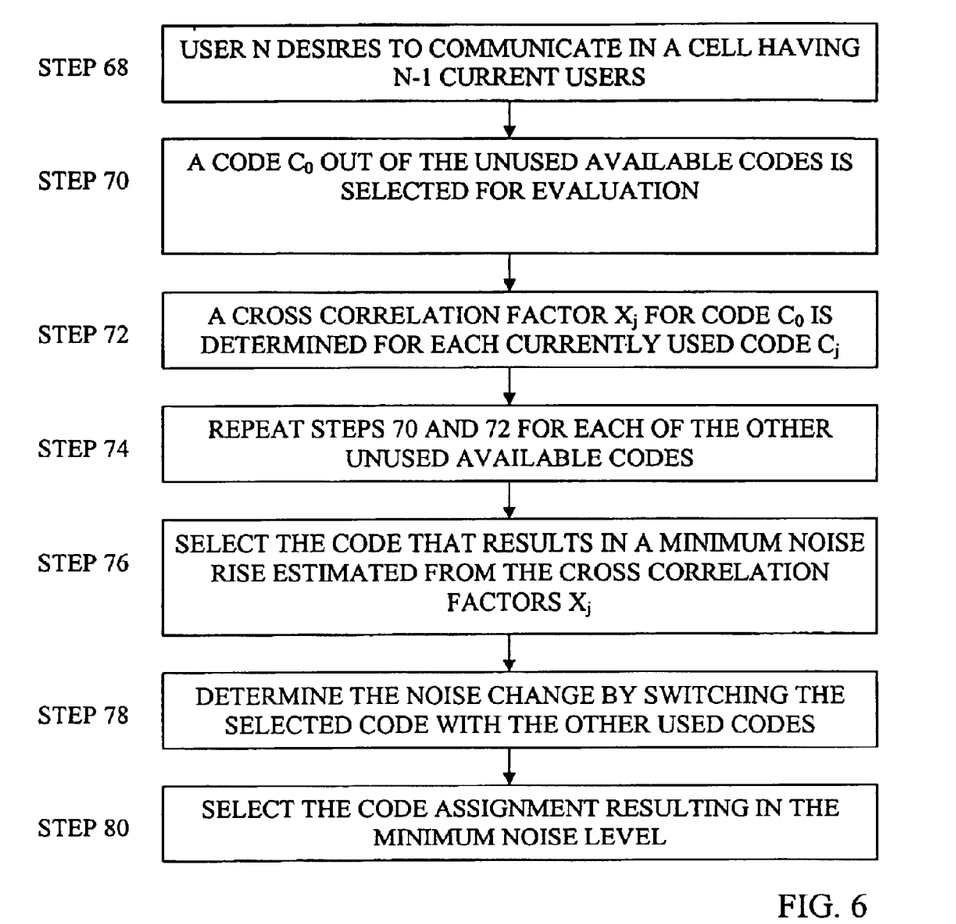
FIG. 6 is a flow chart for assigning codes based on an estimated noise rise.

FIG. 6 is a preferred approach using estimated noise levels to assigning a new code to a new user of a CDMA system. A user N desires to communicate in a cell having N-1 current users, step 68. Out of the unused available codes, a code $C_0$ is selected for evaluation, step 70. The cross code correlation $X_j$ of $C_0$ is determined for each currently used code $C_j$, step 72. Using the determined cross code correlation factors $X_j$, the noise rise from adding the new user using $C_0$ is determined. This procedure is repeated to estimate the noise rise for each of the unused codes, step 74. The code that results in the minimum noise rise is selected to support the new user, step 76.

To further optimize the code assignment, code swapping may be used. After the minimum noise rise code is determined, the noise change by switching this code for each of the other used codes is determined, step 78. The overall code assignment resulting in the minimum estimated noise level is selected, step 80. To illustrate, code $C_n$ is the minimum noise rise code for user N. The noise change for swapping code $C_n$ with each of the other users' codes, $C_1$, to $C_{n-1}$, is determined. A code $C_i$, is found where if $C_n$ is swapped for $C_i$, the noise is minimized. User N is subsequently assigned code $C_i$ and the user of $C_i$ will now use code $C_n$.

Figure 7:
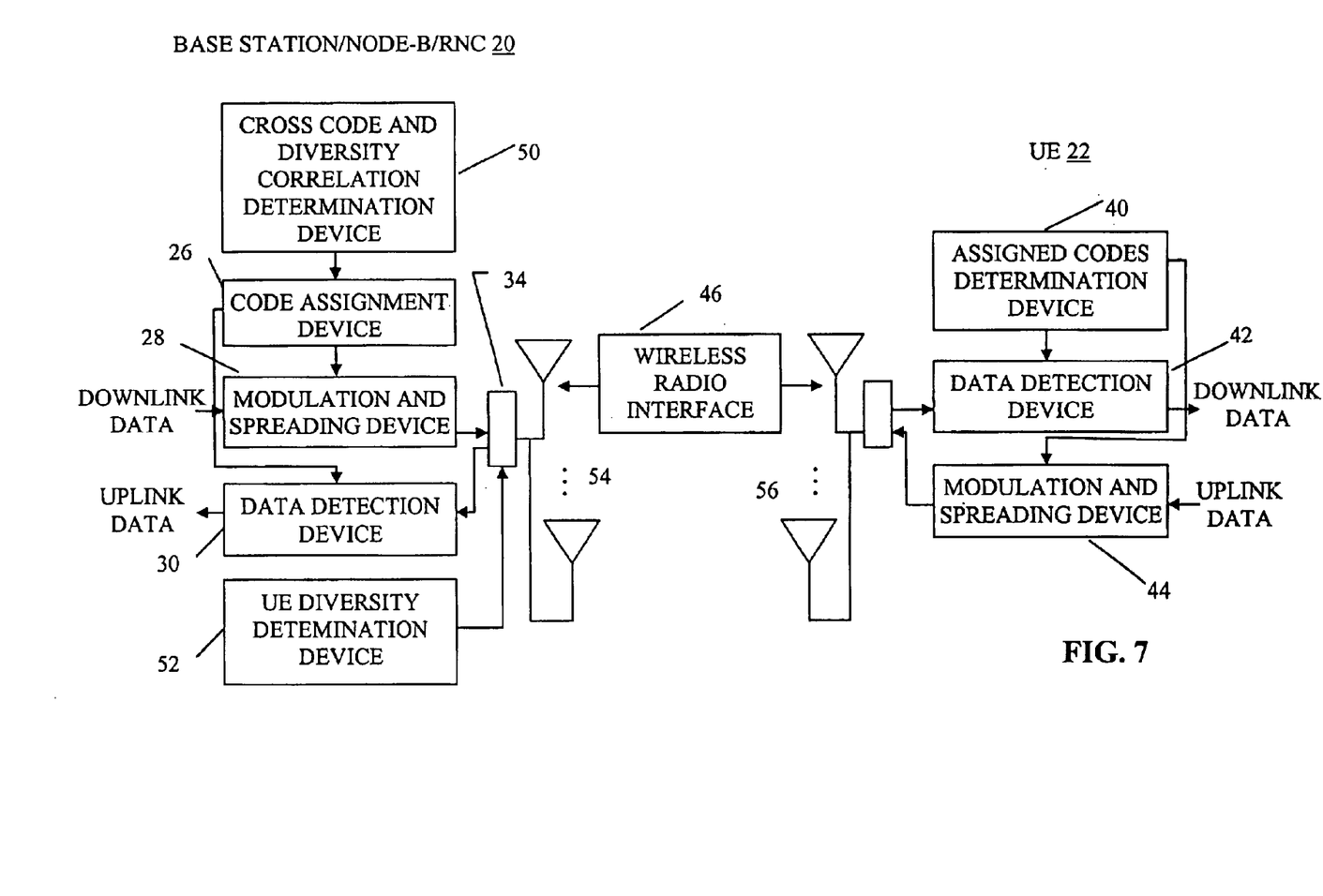
FIG. 7 is an illustration of a simplified base station and UE using cross code correlation and diversity relationships between users for code assignments.

FIG. 7 illustrates an embodiment of a code allocation system where spatial processing is used. An antenna array 54, 56 may be used at either the base station 20, UE 22 or both, as shown in FIG. 7, for spatial diversity. Beams may be formed at a transmitting antenna array 54, 56 to focus a communication onto a particular reception site or a receiving antenna array 54, 56 is used to steer the receiver towards a transmission source. The antenna array 54, 56 of the base station 20 or UE 22 as shown in FIG. 7 may be used for such beam forming and steering.

In the downlink, multiple beams separate codes of users of that base station's cell. Downlink reception beams at the UE 22 separate codes of that UE's cell from other cells. In the uplink, multiple beams used for UE transmissions separate codes of that UE 22 from codes of UEs 22 in other cells.

Uplink reception beams at the base station 20, separate codes for each of that base station's cell UEs 22.

If dowlink transmission diversity or uplink reception diversity schemes are used, users having a different diversity relationship have no or little cross interference. The term diversity relationship refers to users in separate downlink transmission beams or in separate uplink transmission beams. These users communications are effectively orthogonal to each other. As a result, code groups having a high cross code correlation to each other may be assigned to users with a different diversity relationship with no or little cross correlation.

Figure 8:
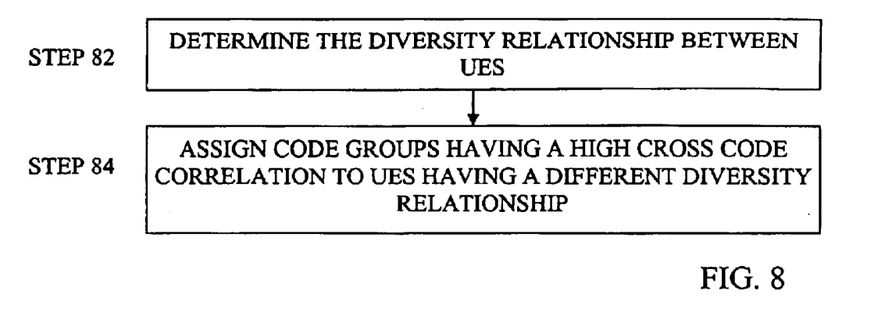
FIG. 8 is a flow chart for assigning code groups having a high cross code correlation to UEs having a different diversity relationship.

One approach to assign codes in such systems is slow code allocation as shown in FIG. 8. Slow code allocation is preferably used in systems where codes are changed slowly, such as over seconds or even longer. In slow allocation, code groups having a high cross code correlation are not assigned to users having a similar or same diversity relationship. A UE diversity determination device 52 determines the diversity relationships between the UEs 22, step 82. One approach to estimate the diversity relationship determines the direction of arrival (DOA) of signals transmitted from users as received at the base station 20. Also, geolocation techniques may be used. If a code group having a high cross code correlation is to be used, the codes of the group are assigned by a cross code and diversity correlation determination device 50 to UEs 22 having different diversity relationships, step 84. As a result, these codes will not interfere with each other.

Figure 9:
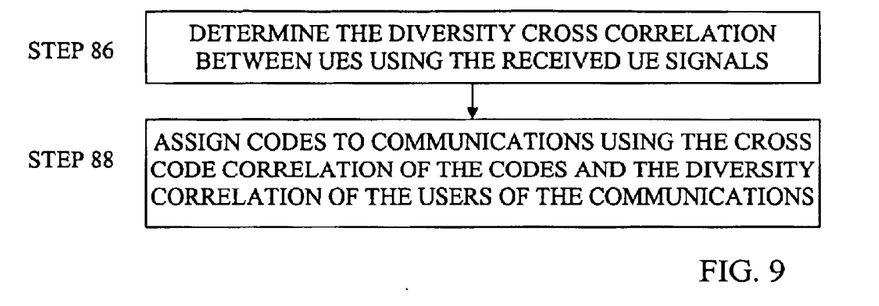
FIG. 9 is a flow chart for assigning codes using both cross code correlation and diversity correlation.

Another approach to assign codes is fast code allocation as shown in FIG. 9. Fast code allocation is preferably used in systems where codes can be changed on the fly, such as the high-speed channel (HSDPA) proposed for the Universal Mobile Telecommunications System (UMTS). It can be used in systems where classical beam forming is not employed. The UE diversity determination device 52 determines the diversity correlation between the received UE signals, step 86. The codes are assigned to the users by the code cross and diversity correlation determination device 50 based on the diversity relationship between the users and the cross code correlation, step 88. Preferably, a diversity factor $S_i$ is assigned to each user and a cross code correlation factor $Y_j$ is assigned to each code. Using the factors, a code assignment is determined which minimizes the resulting cross code noise from the assignment. The resulting cross code noise is preferably modeled using a function, such as the product of $S_i$ and $Y_j$.

Figure 10:
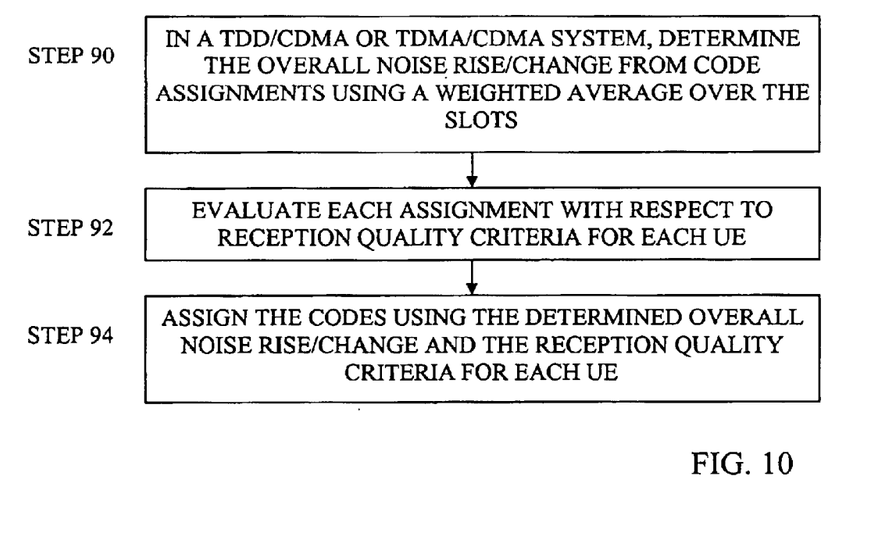
FIG. 10 is a flow chart for assigning codes using a weighted average noise rise/change over all the slots for a time division duplex/CDMA or time division multiple access/CDMA communication system.

Another embodiment is used with TDD/CDMA or TDMA/CDMA systems as shown in FIG. 10. These systems use time slots as well as codes to distinguish communications. In such systems, the overall reception quality is based on a weighted average of the reception quality in each slot. As a result, poor reception quality in one slot can be compensated for in other slots. The cross code correlation determination device 48 or the cross code and diversity correlation device 50 in such systems, preferably, determines the overall noise rise/change from code assignments using a weighted average over the slots, step 90. Each assignment is also checked to see if each user meets minimum reception quality criteria, step 92. Either the code assignment minimizing the noise over the slots and meeting the minimum quality criteria is selected or the code assignment having a most optimal joint solution minimizing the noise over the slots and maximizing each user's reception quality is selected, step 92, 94.

What is claimed is:

1. A method for assigning codes to communications in a wireless code division multiple access communication system, the method comprising:

providing codes for potential assignment;

evaluating the provided codes to determine codes having a high cross code correlation;

determining users of the system having a low transmission power level; and assigning the provided codes so that the provided codes having a high cross code correlation are preferably assigned to the users having a low transmission power level and the provided codes having a low cross code correlation are preferably assigned to the users having a high transmission power level.

2. The method of claim 1 wherein the evaluating the provided codes is by ranking the codes from a highest cross code correlation to a least cross code correlation.

3. The method of claim 1 wherein the evaluating the provided codes is by categorizing the codes using a threshold test.

4. The method of claim 3 wherein the categorizing categorizes the provided codes into a high cross code correlation category and a low cross code correlation category.

5. A wireless code division multiple access radio network controller (RNC) comprising:

means for evaluating provided codes for potential assignment to determine codes having a high cross code correlation;

means for determining users having a low transmission power level; and means for assigning the provided codes so that the provided codes having a high cross code correlation are preferably assigned to the users having a low transmission power level and the provided codes having a low cross code correlation are preferably assigned to the users having a high transmission power level.

6. The RNC of claim 5 wherein the evaluating the provided codes is by ranking the codes from a highest cross code correlation to a least cross code correlation.

7. The RNC of claim 5 wherein the evaluating the provided codes is by categorizing the codes using a threshold test.

8. A wireless code division multiple access radio network controller (RNC) comprising:

a code assignment device for evaluating provided codes for potential assignment to determine codes having a high cross code correlation; for determining users having a low transmission power level; and for assigning the provided codes so that the provided codes having a high cross code correlation are preferably assigned to the users having a low transmission power level and the provided codes having a low cross code correlation are preferably assigned to the users having a high transmission power level.

9. The RNC of claim 8 wherein the evaluating the provided codes is by ranking the codes from a highest cross code correlation to a least cross code correlation.

10. The RNC of claim 8 wherein the evaluating the provided codes is by categorizing the codes using a threshold test.

11. The RNC of claim 10 wherein the categorizing categorizes the provided codes into a high cross code correlation category and a low cross code correlation category.

12. A wireless code division multiple access user equipment (UE) comprising:

an assigned codes determination device for determining codes assigned to support communications of the UE, the code assignment determined by evaluating provided codes for potential assignment to determine codes having a high cross code correlation; determining users having a low transmission power level; and assigning the provided codes so that the provided codes having a high cross code correlation are preferably assigned to the users having a low transmission power level and the provided codes having a low cross code correlation are preferably assigned to the users having a high transmission power level.

13. The UE of claim 12 wherein the evaluating the provided codes is by ranking the codes from a highest cross code correlation to a least cross code correlation.

14. The UE of claim 12 wherein the evaluating the provided codes is by categorizing the codes using a threshold test.

15. The UE of claim 14 wherein the categorizing categorizes the provided codes into a high cross code correlation category and a low cross code correlation category.

16. A method for assigning codes to communications in a wireless code division multiple access communication system, the method comprising:
   providing codes for potential assignment;
   evaluating the provided codes to determine bad groups of codes having a high cross code correlation; and
   assigning the provided codes so that the provided codes in bad groups are preferably assigned to transmissions having a substantially similar transmission power level.

17. The method of claim 16 wherein the evaluating the provided codes to determine bad code groups comprises ranking code groups from a low cross correlation to a high cross correlation of codes within each group.

18. The method of claim 16 wherein the evaluating the provided codes to determine bad code groups comprises categorizing code groups.

19. A wireless code division multiple access radio network controller (RNC) comprising:
   means for evaluating provided codes for potential assignment to determine bad groups of codes having a high cross code correlation; and
   means for assigning the provided codes so that the provided codes in bad groups are preferably assigned to transmissions having a substantially similar transmission power level.

20. The RNC of claim 19 wherein the evaluating the provided codes to determine bad code groups comprises ranking code groups from a low cross correlation to a high cross correlation of codes within each group.

21. The RNC of claim 19 wherein the evaluating the provided codes to determine bad code groups comprises categorizing code groups.

22. A wireless code division multiple access radio network controller (RNC) comprising:
   a code assignment device for evaluating provided codes for potential assignment to determine bad groups of codes having a high cross code correlation; and for assigning the provided codes so that the provided codes in bad groups are preferably assigned to transmissions having a substantially similar transmission power level.

23. The RNC of claim 22 wherein the evaluating the provided codes to determine bad code groups comprises ranking code groups from a low cross correlation to a high cross correlation of codes within each group.

24. The RNC of claim 22 wherein the evaluating the provided codes to determine bad code groups comprises categorizing code groups.

25. A wireless code division multiple access user equipment (UE) comprising:
   an assigned codes determination device for determining codes assigned to support communications of the UE, the code assignment determined by evaluating provided codes for potential assignment to determine bad groups of codes having a high cross code correlation and assigning the provided codes so that the provided codes in bad groups are preferably assigned to transmissions having a substantially similar transmission power level.

26. The UE of claim 25 wherein the evaluating the provided codes to determine bad code groups comprises ranking code groups from a low cross correlation to a high cross correlation of codes within each group.

27. The UE of claim 25 wherein the evaluating the provided codes to determine bad code groups comprises categorizing code groups.

28. A method for assigning codes to communications in a wireless code division multiple access communication system, the method comprising:
   providing codes for potential assignment;
   evaluating provided codes for potential assignment to determine bad groups of codes having a high cross code correlation; and
   assigning the provided codes to coded composite transport channels (CCTrCHs), so that the provided codes of one of the bad code groups are preferably assigned to a same CCTrCH.

29. The method of claim 28 wherein the evaluating the provided codes to determine bad code groups comprises ranking code groups from a low cross correlation to a high cross correlation of codes within each group.

30. The method of claim 28 wherein the evaluating the provided codes to determine bad code groups comprises categorizing code groups.

31. The method of claim 28 wherein the provided codes are codes for downlink code assignment.

32. The method of claim 28 wherein the provided codes are codes for uplink code assignment for communications having a same spreading factor.

33. A wireless code division multiple access radio network controller (RNC) comprising:
   means for evaluating provided codes for potential assignment to determine bad groups of codes having a high cross code correlation; and
   means for assigning the provided codes to coded composite transport channels (CCTrCHs), so that the provided codes of one of the bad code groups are preferably assigned to a same CCTrCH.

34. The RNC of claim 33 wherein the evaluating the provided codes to determine bad code groups comprises ranking code groups from a low cross correlation to a high cross correlation of codes within each group.

35. The RNC of claim 33 wherein the evaluating the provided codes to determine bad code groups comprises categorizing code groups.

36. The RNC of claim 33 wherein the provided codes are codes for downlink code assignment.

37. The RNC of claim 33 wherein the provided codes are codes for uplink code assignment for communications having a same spreading factor.

38. A wireless code division multiple access radio network controller (RNC) comprising:
   a code assignment device for evaluating provided codes for potential assignment to determine bad groups of codes having a high cross code correlation; and for assigning the provided codes to coded composite transport channels (CCTrCHs), so that the provided codes of one of the bad code groups are preferably assigned to a same CCTrCH.

39. The RNC of claim 38 wherein the evaluating the provided codes to determine bad code groups comprises ranking code groups from a low cross correlation to a high cross correlation of codes within each group.

40. The RNC of claim 38 wherein the evaluating the provided codes to determine bad code groups comprises categorizing code groups.

41. The RNC of claim 38 wherein the provided codes are codes for downlink code assignment.

42. The RNC of claim 38 wherein the provided codes are codes for uplink code assignment for communications having a same spreading factor.

43. A wireless code division multiple access user equipment comprising:

an assigned codes determination device for determining codes assigned to support communication of the UE, the code assignment determined by evaluating provided codes for potential assignment to determine bad groups of codes having a high cross code correlation; and assigning the provided codes to coded composite transport channels (CCTrCHs), so that the provided codes of one of the bad code groups are preferably assigned to a same CCTrCH.

44. The UE of claim 43 wherein the evaluating the provided codes to determine bad code groups comprises ranking code groups from a low cross correlation to a high cross correlation of codes within each group.

45. The UE of claim 43 wherein the evaluating the provided codes to determine bad code groups comprises categorizing code groups.

46. The UE of claim 43 wherein the provided codes are codes for downlink code assignment.

47. The UE of claim 43 wherein the provided codes are codes for uplink code assignment for communications having a same spreading factor.

48. A method for assigning codes to communications in a wireless code division multiple access communication system, the method comprising:

providing codes for potential assignment;

determining a cross correlation factor for each potential code, the cross correlation factor indicating a cross code correlation between that potential code and other codes;

for each potential code, calculating a noise change to the system using the cross correlation factor; and selecting a code of the potential codes for assignment having a minimum noise change.

49. The method of claim 48 wherein the selected code is assigned to a new communication.

50. The method of claim 48 further comprising:

calculating a noise change resulting from exchanging the selected code with codes currently used by the system; and if the calculated noise change for exchanging the selected code with one of the currently used codes indicates a lower overall noise level by exchanging the codes, the selected and the one currently used code are exchanged.

51. A wireless code division multiple access radio network controller (RNC) comprising:

means for determining a cross correlation factor for each potential code for potential assignment, the cross correlation factor indicating a cross code correlation between that potential code and other codes;

means for each potential code, for calculating a noise change using the cross correlation factor; and means for selecting a code of the potential codes for assignment having a minimum noise change.

52. The RNC of claim 51 wherein the selected code is assigned to a new communication.

53. The RNC of claim 52 further comprising:

means for calculating a noise change resulting from exchanging the selected code with currently used codes currently; and means for if the calculated noise change for exchanging the selected code with one of the currently used codes indicates a lower overall noise level by exchanging the codes, exchanging the selected and the one currently used code.

54. A wireless code division multiple access radio network controller (RNC) comprising:

a code assignment device for determining a cross correlation factor for each potential code for potential assignment, the cross correlation factor indicating a cross code correlation between that potential code and other codes; for each potential code, for calculating a noise change using the cross correlation factor; and for selecting a code of the potential codes for assignment having a minimum noise change.

55. The RNC of claim 54 wherein the selected code is assigned to a new communication.

56. The RNC of claim 54 wherein the code assignment device further for calculating a noise change resulting from exchanging the selected code with currently used codes; and for if the calculated noise change for exchanging the selected code with one of the currently used codes indicates a lower overall noise level by exchanging the codes, exchanging the selected and the one currently used code.

57. A wireless code division multiple access user equipment (UE) comprising: an assigned codes determination device determining codes assigned to support communications of the UE, the code assignment determined by determining a cross correlation factor for each potential code for potential assignment, the cross correlation factor indicating a cross code correlation between that potential code and other codes; for each potential code, calculating a noise change using the cross correlation factor; and selecting a code of the potential codes for assignment having a minimum noise change.

58. The UJE of claim 57 wherein the selected code is assigned to a new communication.

59. The UE of claim 57 wherein the code assignment further determined by calculating a noise change resulting from exchanging the selected code with currently used codes; and if the calculated noise change for exchanging the selected code with one of the currently used codes indicates a lower overall noise level by exchanging the codes, exchanging the selected and the one currently used code.

* * * * *

UNITED STATES PATENT AND TRADEMARK OFFICE
CERTIFICATE OF CORRECTION

PATENT NO. : 6,888,814 B2
DATED : May 3, 2005
INVENTOR(S) : Zeira et al.

It is certified that error appears in the above-identified patent and that said Letters Patent is hereby corrected as shown below:

Delete Figure 7 and please replace Figure 7 with replacement Figure 7 attached hereto.

Column 1,
Line 65, after the word "resources", delete ". The" and insert therefor -- , the --.

Column 4,
Line 48, after the word "codes,", delete "$C_l$" and insert therefor -- $C_1$ --.

Column 10,
Line 53, after the first instance of the word "The", delete "UJE" and insert therefor -- UE --.

Signed and Sealed this

Twenty-ninth Day of November, 2005

JON W. DUDAS
*Director of the United States Patent and Trademark Office*

FIG. 7